(12) United States Patent
Goswami et al.

(10) Patent No.: US 10,472,241 B2
(45) Date of Patent: Nov. 12, 2019

(54) PROCESS FOR THE SYNTHESIS OF CARBON NANOTUBES

(71) Applicant: Reliance Industries Limited, Mumbai (IN)

(72) Inventors: Gopal Krishna Goswami, Kolkata (IN); Swanand Dilip Patil, Pune (IN); Sreekumar Thaliyil Veedu, Kannur (IN); Vijai Shankar Balachandran, Vellore (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/766,303

(22) PCT Filed: Oct. 6, 2016

(86) PCT No.: PCT/IB2016/055982
§ 371 (c)(1),
(2) Date: Apr. 5, 2018

(87) PCT Pub. No.: WO2017/060843
PCT Pub. Date: Apr. 13, 2017

(65) Prior Publication Data
US 2018/0290889 A1    Oct. 11, 2018

(30) Foreign Application Priority Data
Oct. 6, 2015 (IN) .......................... 3789/MUM/2015

(51) Int. Cl.
*C01B 32/16* (2017.01)

(52) U.S. Cl.
CPC .......... *C01B 32/16* (2017.08); *C01P 2002/04* (2013.01)

(58) Field of Classification Search
CPC ..... C01B 32/16; C01B 32/162; C01B 32/166; C01B 2002/04
See application file for complete search history.

(56) References Cited

U.S. PATENT DOCUMENTS

2008/0247939 A1* 10/2008 Iyuke ................. B82Y 30/00
423/447.3
2014/0199546 A1   7/2014 Sun et al.

FOREIGN PATENT DOCUMENTS

GB       2518249 A  *  3/2015  ........... C30B 29/403
IN    2089/MUM/2013     6/2015

OTHER PUBLICATIONS

Szekrenyes, Zs, et al. "Synthesis and Raman characterization of single-walled carbon nanotubes growth by injection chemical vapour deposition." Journal of optoelectronics and advanced materials 9.3 (2007): 605.*

(Continued)

*Primary Examiner* — Richard M Rump
(74) *Attorney, Agent, or Firm* — Osha Liang LLP

(57) ABSTRACT

The present disclosure relates to a process for the synthesis of highly crystalline carbon nanotubes (CNTs). Processes known in the art employ post-synthesis processes such as oxidation or hydrothermal treatment to produce CNTs with high crystallinity. The present disclosure produces highly crystalline CNTs at a low growth temperature and without hydrogen flow condition and without employing any post-production process. The process disclosed in the present disclosure produces CNTs having a crystallinity greater than 5 which makes them suitable for various industrial applications.

7 Claims, 3 Drawing Sheets

(56) References Cited

OTHER PUBLICATIONS

Figure 1:
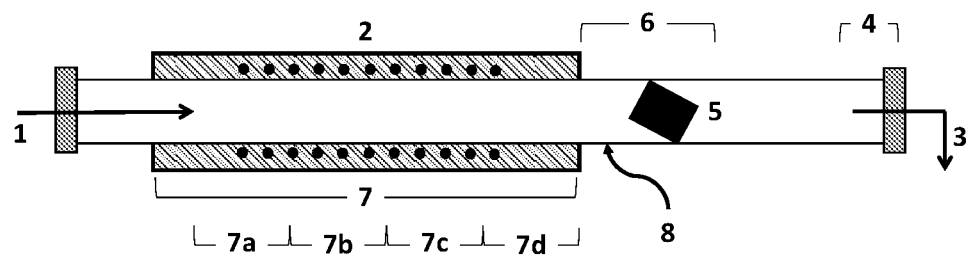

Chaisitsak, S., J. Nukeaw, and A. Tuantranont. "Parametric study of atmospheric-pressure single-walled carbon nanotubes growth by ferrocene-ethanol mist CVD." Diamond and Related Materials 16.11 (2007): 1958-1966.*
Campos-Delgado, Jessica, et al. "Chemical vapor deposition synthesis of N-, P-, and Si-doped single-walled carbon nanotubes." ACS Nano 4.3 (2010): 1696-1702.*
Conroy, Devin, et al. "Carbon nanotube reactor: Ferrocene decomposition, iron particle growth, nanotube aggregation and scale-up." Chemical Engineering Science 65.10 (2010): 2965-2977.*
Chaisitsak, S., and A. Tuantranont. "Effect of the Deposition Condition for Carbon Nanotube Thin Films on Gas Sensing Performance." Sensor Letters 6.6 (2008): 1023-1027.*
Reynaud, Olivier, et al. "Aerosol feeding of catalyst precursor for CNT synthesis and highly conductive and transparent film fabrication." Chemical Engineering Journal 255 (2014): 134-140.*
Atiyah, Muataz R., et al. "Low temperature growth of vertically aligned carbon nanotubes via floating catalyst chemical vapor deposition method." Journal of Materials Science & Technology 27.4 (2011): 296-300.*
International Search Report issued in PCT/IB2016/055982 dated Nov. 18, 2016 (2 pages).
Written Opinion issued in PCT/IB2016/055982 dated Nov. 18, 2016 (6 pages).

* cited by examiner

PROCESS FOR THE SYNTHESIS OF CARBON NANOTUBES

FIELD

The present disclosure relates to a process for the synthesis of carbon nanotubes.

Definition

Crystallinity of the carbon nanotubes: defined as the ratio of the intensities of graphitic (G) to disorder (D) band of Raman spectra.

BACKGROUND

After the first discovery of Carbon nanotubes (CNTs) in 1991, there has been a rapid growth in the use of CNTs in various fields such as medical applications, high strength composites, energy devices, electronic applications and the like. Crystallinity of CNTs is a crucial factor for the use of CNTs in various fields. However, the crystallinity of CNTs is difficult to control.

Various processes have been suggested for the synthesis of crystalline CNTs at high temperature with vaporization and decomposition of precursors under a continuous flow of hydrogen. The vaporization and decomposition of precursors is carried out using additional heaters connected to the growth furnace. However, the cost of the CNT-production increases exponentially with rise in the temperature. Further, CNTs with high crystallinity are produced by post-synthesis processes. The post-synthesis processes such as oxidation or hydrothermal treatment comprising separation, purification, dispersion, and the like, are cumbersome as well as non-economical.

Further, the enhancement of crystallinity has been achieved by introducing either water-vapor/oxygen/carbon dioxide gas or sulfur containing compound into the synthesis process. But, that again results in higher production cost of the carbon nanotubes.

Therefore, there still exists a need for providing a cost-effective process for the synthesis of crystalline CNT-films/mats at a lower temperature and without using hydrogen as a carrier gas.

Objects

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a process for obtaining highly crystalline CNT-films/mats.

Yet another object of the present disclosure is to provide a process that reduces the production cost for preparing CNT-films/mats.

Still another object of the present disclosure is to provide a process for continuous production of CNT-films/mats at low growth temperatures.

Yet another object of the present disclosure is to provide ready to use highly crystalline carbon nanotubes.

Still another object of the present disclosure is to provide a process that avoids hydrogen as a carrier gas for obtaining highly crystalline CNTs.

Yet another object of the present disclosure is to provide a process for continuous production of easily recoverable highly crystalline CNT-films/mats deposited in the warm temperature zone distant from the furnace.

Still another object of the present disclosure is to provide a process for producing CNT-films in situ on diverse substrate materials such as polymers, semiconductors, metals and the like.

Yet another object of the present disclosure is to provide a process for continuous production of free-standing CNT-films/mats.

Still another object of the present disclosure is to produce free-standing CNT-films/mats in a single step process by avoiding any post production processing steps for the CNTs.

Other objects and advantages of the present disclosure will be more apparent from the following description, which is not intended to limit the scope of the present disclosure.

SUMMARY

The present disclosure envisages a process for the synthesis of carbon nanotubes (CNTs). The process is carried out by placing a substrate in a warm temperature zone (<200° C.) inside a reactor for easy recovery of the CNT-films. A carrier gas is introduced into the reactor to remove atmospheric gases present in the reactor. Moreover, the carrier gas carries the vapors of precursors into the high temperature zone as well as moves forward the formed CNTs which are deposited as films distant from the furnace. The reactor is heated to a temperature ranging from 800° C. to 1300° C. using a furnace and then a feedstock comprising a carbon source and a catalyst composition, is injected into the reactor. On heating, the feedstock evaporates and decomposes to form the CNTs, which are deposited as such or in the form of a film either free-standing inside the reactor or supported on the substrate that is positioned in the reactor. The CNTs deposited in the warm temperature zone (<200° C.) and at the end of the reactor, have a high crystallinity over the CNTs deposited in the hot temperature zone. The crystallinity of thus obtained carbon nanotubes, as defined by the ratio of the intensities of graphitic (G) to disorder (D) band of Raman spectra, is observed to be greater than 5.

The catalyst composition used for the synthesis of the CNTs comprises a catalyst in the range of 0.1 to 5 wt %. Optionally, the catalyst composition used for the synthesis of the CNTs can comprise a co-catalyst in the range of 0.1 to 5 wt % and a growth promoter in the range of 0.1 to 10 wt % of the feedstock. The catalyst can be ferrocene whereas the co-catalyst can be at least one selected from the group consisting of nickelocene and cobaltocene. The growth promoter can be at least one selected from the group consisting of molybdenum, bismuth and at least one sulfur containing compound selected from the group consisting of thiophene, hydrogen sulfide, carbon di-sulfide and thio-urea.

The material of the substrate can be at least one metal selected from the group consisting of copper and tungsten, at least one alloy selected from the group consisting of brass and stainless steel; at least one metal compound selected from the group consisting of magnesium oxide, zinc oxide, and tungsten carbide; at least one polymer selected from the group consisting of polyethylene (PE), polytetrafluoroethylene (PTFE), polyethylene terephthalate (PET) and polyvinyl chloride (PVC); at least one semiconductor including indium tin oxide (ITO) coated glass; at least one glass plate, wherein the glass plate is made of glass that is selected from the group consisting of fiberglass mat, soda-lime glass, pyrex glass and borosil glass; and at least one fiber-reinforced polymer composite. The fiber-reinforced polymer composite comprises at least one fiber selected from the group consisting of glass, carbon, CNTs, aramid, kevlar and polymer matrix; and at least one polymer selected from the group consisting of epoxy, polyvinylpyrrolidone (PVP), polyethylene terephthalate (PET), polypropylene (PP) and polyvinyl chloride (PVC) polymer.

BRIEF DESCRIPTION OF THE ACCOMPANYING DRAWING

Figure 2:
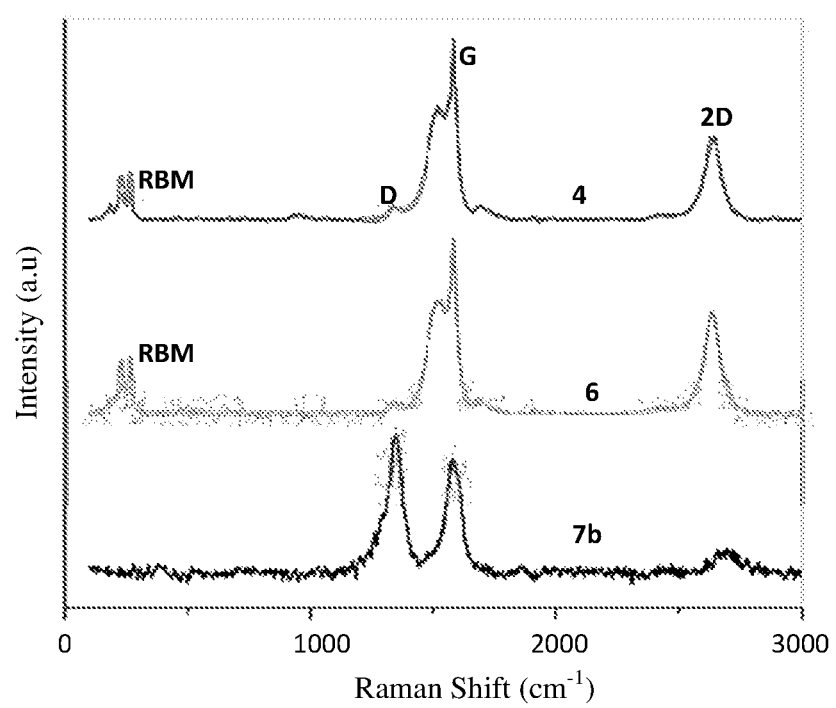
Figure 3:
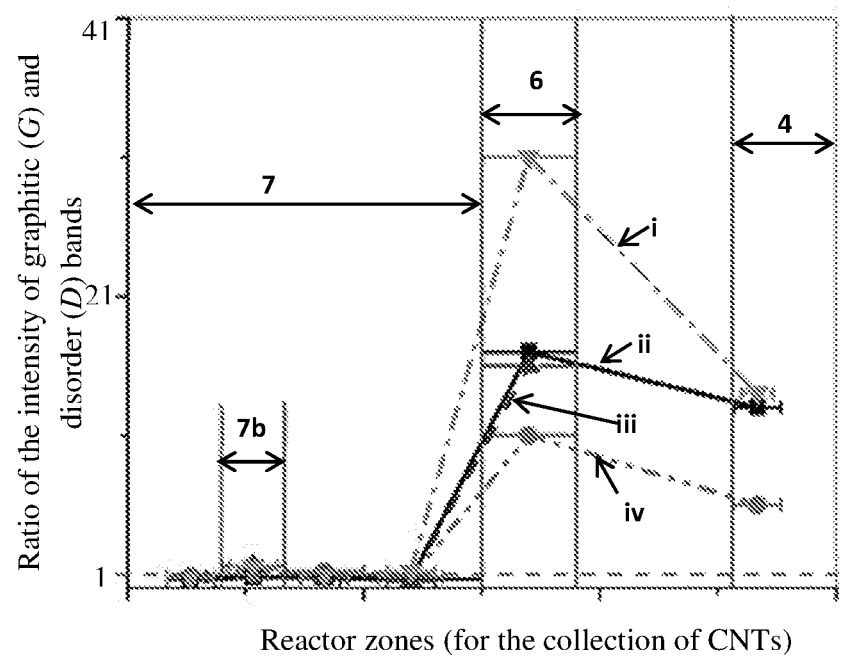

The process for the synthesis of carbon nanotubes will now be described with the help of the accompanying drawing, in which:

FIG. 1 is a schematic representation of an apparatus used in the synthesis of the CNTs in accordance with the present disclosure;

FIG. 2 illustrates graph(s) showing variation in the intensity of graphitic (G) and disorder (D) bands in the Raman spectra of the CNTs collected from the different zones of the reactor; and FIG. 3 illustrates graph(s) showing variation in the ratio of the intensity of graphitic (G) and disorder (D) bands in the Raman spectra of the CNTs collected from the different zones of a reactor under various experimental conditions in accordance with the present disclosure.

DETAILED DESCRIPTION

Cost-effective production of highly crystalline carbon nanotubes (CNTs) is a challenging process. Various processes have been reported for the synthesis of highly crystalline carbon nanotubes such as laser ablation, pyrolysis, arc-discharge and the like, but they are cumbersome as well as non-economical.

The process for the synthesis of the CNTs as disclosed in the present disclosure is a cost-effective process which avoids any prerequisite catalyst/substrate preparation step. The process of the present disclosure can be used for low temperature continuous production of highly crystalline CNTs and the CNTs can be directly grown/deposited on a substrate.

In accordance with one aspect of the present disclosure, there is provided a process for the synthesis of carbon nanotubes. The process as disclosed in the present disclosure is a single step process which avoids any post production processing of the CNTs.

The apparatus used for the synthesis of the CNTs as shown in FIG. 1, comprises; a reactor '8' provided with facilities for introducing a feedstock and a carrier gas and an outlet '3' for the exhaust gases and a furnace '2' for heating the reactor '8'. A substrate '5' is placed inside the reactor '8' for easy recovery of the carbon nanotube-films deposited thereon. The carrier gas and the feedstock can be introduced in the reactor '8' through an inlet '1'. The carrier gas used in the process of the present disclosure facilitates removal of the atmospheric gases present in the reactor '8' and also carries the vapors of precursors into the high temperature zone for the synthesis of the CNTs. Further, the carrier gas facilitates in moving forward the formed CNTs which are deposited as films distant from the furnace '2'. The carrier gas is initially passed at a higher flow rate through the inlet '1' and thereafter the flow rate of the carrier gas is gradually decreased to a lower flow rate throughout the growth process by using a rotameter (not shown in FIG. 1). The reactor '8' is heated to a temperature in the range of 800° C. to 1300° C., using the furnace '2' for synthesizing the CNTs. The feedstock is introduced in the reactor '8' through the inlet '1'. The feedstock that is introduced into the reactor '8' comprises a carbon source, at least one growth promoter and at least one catalyst composition. On heating, the feedstock evaporates and decomposes to form CNTs. The CNTs start depositing as such or in the form of a film either free-standing inside the reactor '8' or supported on the substrate '5' placed in the reactor '8'. The reactor '8' has different zones for the deposition of the CNTs. The zone '7' of the reactor '8', is a hot temperature zone which is further divided into zones '7a', '7b', '7c' and '7d'. The zone '6' of the reactor '8' is a warm temperature zone, as shown in FIG. 1. The temperature of the warm temperature zone '6' is less than 200° C., whereas the temperature of the hot temperature zone '7' is in the range of 800° C. to 1300° C. The substrate '5' is placed in the warm temperature zone '6' of the reactor '8' at a location distant from the furnace '2' for easy recovery of the carbon nanotube-films, where the temperature of the reactor '8' is less than 200° C. The CNTs are continuously produced and deposited inside the reactor '8' as free-standing film and on the substrate '5' placed in the warm temperature zone '6'.

Thereafter, the reactor '8' is cooled to room temperature and the CNTs deposited in the warm and hot temperature zones of the reactor '8' are collected and tested by Raman spectroscopy.

In accordance with the process of the present disclosure, the variation in the intensity of graphitic (G) and disorder (D) bands respectively in the Raman spectra of the CNTs collected from the different zones of the reactor '8', is shown in FIG. 2. In FIG. 2, D band depicts the amorphous content as well as dangling bonds in the CNTs, whereas G band represents the crystalline nature of the CNTs. The 2D band is the second overtone of D band. The graphs as shown in FIG. 2 depict the variation in the intensity of graphitic (G) and disorder (D) bands in the Raman spectra of the CNTs deposited and collected from the end '4' of the reactor '8', from warm temperature zone '6' of the reactor '8' and from one of the hot temperature zone '7b' of the reactor '8'. The presence of more crystalline CNTs that is always challenging to obtain at lower temperatures is indicated by the ratio of the intensities of G to D being greater than unity. It is observed that the crystallinity of the CNTs collected from the warm temperature zone '6' and from the end '4' of the reactor '8', are better than the CNTs collected from the hot temperature zone '7'. Typically, the crystallinity of the CNTs obtained from the end '4' of the reactor '8' and from the warm temperature zone '6' are observed to be greater than 5.

The feedstock used in the process of the present disclosure can comprise at least one carbon source selected from the group consisting of $C_1$ to $C_7$ hydrocarbons and $C_1$ to $C_7$ alcohols.

In accordance with the present disclosure, the catalyst composition can comprise a catalyst in the range of 0.1 to 5 wt % of the feedstock. Further, the catalyst composition of the present disclosure can comprise at least one element selected from the group consisting of iron, nickel and cobalt.

Optionally, the catalyst composition can comprise a co-catalyst in the range of 0.1 to 5 wt % of the feedstock and a growth promoter in the range of 0.1 to 10 wt % of the feedstock.

The co-catalyst of the catalyst composition of the present disclosure can be at least one selected from the group consisting of nickelocene and cobaltocene.

The growth promoter of the catalyst composition of the present disclosure can be at least one selected from the group consisting of molybdenum, bismuth and at least one sulfur containing compound selected from the group consisting of thiophene, hydrogen sulfide, carbon di-sulfide and thio-urea.

In accordance with the present disclosure, the catalyst is ferrocene.

In accordance with an exemplary embodiment of the present disclosure, the alcohol is ethanol and the hydrocarbon source is benzene.

In accordance with the embodiment of the present disclosure, the reactor '8' is a quartz tube disposed within a furnace '2'.

The material of the substrate '5' which is placed inside the reactor '8' for the deposition of CNTs as such or in the form of a film, can be at least one selected from the group consisting of at least one metal selected from the group consisting of copper and tungsten; at least one alloy selected from the group consisting of brass and stainless steel; at least one metal compound selected from the group consisting of magnesium oxide, zinc oxide, and tungsten carbide; at least one polymer selected from the group consisting of polyethylene (PE), polytetrafluoroethylene (PTFE), polyethylene terephthalate (PET) and polyvinyl chloride (PVC); at least one semiconductor including indium tin oxide (ITO) coated glass; at least one glass plate, wherein the glass plate is made of glass that is selected from the group consisting of fiberglass mat, soda-lime glass, pyrex glass and borosil glass; and at least one fiber-reinforced polymer composite. The fiber of the fiber-reinforced polymer composite can be at least one selected from the group consisting of glass, carbon, CNTs, aramid, kevlar and polymer matrix; and the polymer can be at least one selected from the group consisting of epoxy, polyvinylpyrrolidone (PVP), polyethylene terephthalate (PET), polypropylene (PP) and polyvinyl chloride (PVC) polymer.

In accordance with an exemplary embodiment of the present disclosure, copper and polytetrafluoroethylene (PTFE) film can be used as the substrate.

The carrier gas used in the process of the present disclosure can be selected from the group consisting of nitrogen, argon and methane.

In accordance with an exemplary embodiment of the present disclosure, nitrogen gas is used as the carrier gas.

The present disclosure is further described in light of the following experiment(s) which are set forth for illustration purpose only and not to be construed for limiting the scope of the present disclosure. These laboratory scale experiments provided herein can be scaled up to industrial or commercial scale.

EXPERIMENT(S)

Experiment 1

A quartz tube was used as a reactor '8' that was placed in a furnace '2'. A copper foil, used as a substrate '5' was placed in the warm temperature zone '6' of the reactor '8'. Initially, nitrogen was passed at a flow rate of 2000 ml/min from an inlet '1', to replace the atmospheric gases from the reactor '8' and thereafter the flow rate of nitrogen was maintained at 200 ml/min throughout the growth process by a rotameter. The exhaust gases, containing nitrogen and other byproducts were taken out through an outlet '3'. The reactor '8' was heated to a desired temperature (800° C. or 1000° C.) using the furnace '2' under continuous nitrogen flow. After the reactor '8' reached the desired temperature, feedstock was introduced in the reactor '8'. Two ferrocene concentrations, 0.5 and 1.0 wt % of the feedstock, were employed in order to evaluate the effect of the concentration of the catalyst on the CNTs growth process. Ferrocene was dissolved in ethanol and the resulting solution comprising 0.5 wt % and 1.0 wt % ferrocene, were introduced in an evaporation or a decomposition zone of the furnace '2' at a flow rate of 10 ml/h. The temperature profile of the furnace '2' was figured out and the feedstock was introduced such that the feedstock was in the evaporation or the decomposition zone to evaporate or decompose. The feedstock evaporation temperature zone of 400° C. to 600° C. was chosen for optimizing the growth process of the CNTs. On heating the reactor '8', the feedstock is evaporated, and decomposed as such or in the form of a film, either freestanding inside the reactor '8' or supported on the substrate '5' positioned in the reactor '8'. After the growth process, the furnace '2' was air-cooled to room temperature under continuous flow of nitrogen.

The product, deposited in the hot temperature zone '7', warm temperature zone '6', on the substrate '5' and at the end '4' of the reactor '8', were carefully recovered and tested by Scanning electron microscopy, transmission electron microscopy and Raman spectroscopy. Scanning electron microscopy of the collected CNTs shows that the CNTs deposited in the warm temperature zone '6' and on the substrate '5' were longer (>10 □m) and thinner as compared to the CNTs deposited in the hot temperature zone '7'. Thinner CNTs generally have better electrical conductivity, mechanical strength associated with lesser defects. Further, Transmission electron microscopy of the CNTs showed the formation of nanotube structure with mixture of single-walled CNTs and multi-walled CNTs deposited in the warm temperature zone '6' and on the substrate '5'. The dimensions of thus obtained free-standing CNT mats were observed to be 2 inch by 24 inch.

FIG. 2 shows the variation in the intensity of graphitic (G) and disorder (D) bands in the Raman spectra of the CNTs deposited and collected from the end '4' of the reactor '8', warm temperature zone '6' and one of the hot temperature zone '7b' under the process condition of 800° C. and 1% ferrocene concentration. The presence of radial breathing mode (RBM) in the Raman spectra of the CNTs shows the presence of single walled CNTs and which was absent in the CNTs obtained from the hot temperature zone '7b' of the reactor '8'.

The variation in the ratio of the intensity of graphitic (G) and disorder (D) bands respectively in the Raman spectra of the CNTs collected from one of the hot temperature zone '7b', from the hot temperature zone '7', from the warm temperature zone '6' and from the end '4' of the reactor '8' under various experimental conditions is shown in FIG. 3. Curves i, ii, iii and iv in FIG. 3 represent the variation in the ratio of the intensity of graphitic (G) and disorder (D) bands of the CNTs obtained at different growth temperature and ferrocene concentration conditions in the reactor as 1000° C. and 1 wt %; 800° C. and 1 wt %; 1000° C. and 0.5 wt %; and 800° C. and 0.5 wt % respectively. FIG. 3 shows that the ratio of the intensity of graphitic (G) and disorder (D) bands of the CNTs obtained from the warm temperature zone '6' (also from the substrate '5') of the reactor '8' and from the end '4' of the reactor '8' were higher as compared to the CNTs obtained from hot temperature zone '7' of the reactor '8' which depicts that the CNTs obtained from the warm temperature zone '6' (also from the substrate '5') of the reactor '8' and from the end '4' of the reactor '8' have better crystallinity than the CNTs obtained from the hot temperature zone '7' of the reactor '8'. Further, under the growth temperature of 1000° C. and ferrocene concentration of 1 wt % for curve i, CNTs obtained from the end '4' of the reactor '8' and from the warm temperature zone '6' (also from the substrate '5') of the reactor '8' show the highest ratio of the intensity of graphitic (G) and disorder (D) bands showing that the temperature and the ferrocene concentration play an important role in determining the crystallinity of the CNTs. Overall, the CNTs collected from the warm temperature zone '6' (also from the substrate '5') of the reactor '8' and from the end '4' of the reactor '8' were thinner and longer with better crystallinity than those collected from the hot temperature zone '7'.

Experiment 2

Further, Experiment 2 was conducted using the same experimental setup as used for Experiment 1. A copper foil, used as a substrate '5' was placed in the warm temperature zone '6' of the reactor '8' for the deposition of the CNTs. Nitrogen gas was passed at 1000 ml/min from the inlet '1', to replace the atmospheric gases from the reactor '8'. The reactor '8' was heated to 950° C. using the furnace '2' under continuous nitrogen flow. After that, 1 wt % ferrocene dissolved in benzene was introduced into the reactor '8' at a flow rate of 2.5 ml/h for the synthesis of CNTs. On heating the reactor '8', the feedstock was allowed to evaporate and decompose to form CNTs deposited as such or in the form of a film, either free-standing inside the reactor '8' or supported on the substrate '5' positioned in the reactor '8'. The CNTs, deposited in the hot temperature zone '7', warm temperature zone '6', on the substrate '5' and at the end '4' of the reactor '8', were carefully recovered and tested.

The CNTs deposited in the hot temperature zone '7' and in the warm temperature zone '6' of the reactor '8' show the similar trend of crystallinity as observed in Experiment 1. The ratio of the intensity of graphitic (G) and disorder (D) bands of the CNTs deposited in the hot temperature zone '7' was 1.9. Whereas, for the CNTs deposited in the warm temperature zone '6' of the reactor '8' and on the substrate '5', the ratio of the intensity of graphitic (G) and disorder (D) bands was 5.6, which shows that the crystallinity of the CNTs deposited in the warm temperature zone '6' of the reactor '8' and on the substrate '5' was higher as compared to the CNTs deposited in the hot temperature zone '7' of the reactor '8'.

Experiment 3

Another experiment was conducted for the synthesis of CNTs using 0.5 wt % ferrocene dissolved in ethanol. A PTFE film, used as a substrate '5' was placed in the warm temperature zone '6' of the reactor '8'. Nitrogen gas was passed at a flow rate of 200 ml/min from the inlet '1', to replace the atmospheric gases from the reactor '8'. The reactor '8' was heated to 800° C. using the furnace '2' under continuous nitrogen flow. Thereafter, 0.5 wt % ferrocene dissolved in ethanol was introduced into the reactor at a flow rate of 10 ml/h. On heating the reactor '8', the feedstock was allowed to evaporate and decompose to form CNTs deposited as such or in the form of a film, either free-standing inside the reactor '8' or supported on the substrate '5' positioned in the reactor '8'. The deposited CNTs were carefully removed and tested. The CNTs deposited in the warm temperature zone '6' of the reactor '8' and on the substrate '5' show better crystallinity as compared to CNTs collected from hot temperature zone '7' of reactor '8'. The ratio of the intensity of graphitic (G) and disorder (D) bands of the CNTs collected from the hot temperature zone '7' was observed to be 0.8. Whereas, the ratio of the intensity of graphitic (G) and disorder (D) bands was observed to be 9.0 for the CNTs deposited in the warm temperature zone '6' of the reactor '8' and on the substrate '5' which confirms that the crystallinity of the CNTs deposited in the warm temperature zone '6' of the reactor '8' and on the substrate '5' was higher than the CNTs obtained from hot temperature zone '7' of the reactor '8'.

Thus, the process disclosed in the present disclosure provides the synthesis and easy-recovery of highly crystalline CNTs while avoiding post production processing, to obtain the CNTs. The lower growth temperature, absence of any hydrogen flow, avoidance of any catalyst preparation step, and operation under industrial grade nitrogen makes the process cost-effective for commercialization.

Technical Advances and Economical Significance

The present disclosure described herein above has several technical advantages including, but not limited to, the realization of:
    a process that produces CNTs in a single step by avoiding any post production processing of the CNTs thereby reduces the production cost;
    a process for continuous production of CNT-films;
    a process that does not use hydrogen as carrier gas for preparing CNTs;
    a process that produces highly crystalline CNTs at the warm temperature zone of the reactor distant from the furnace;
    a process for easily recoverable CNT-films;
    a process for synthesis of large-area free-standing CNT-mats;
    a process that utilizes a low growth temperature for the synthesis of CNTs, that makes the process economical; and
    CNT-films that can be directly grown/deposited on any substrate material.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the synthesis of carbon nanotubes, said process comprising the following steps:
   a) introducing in a reactor a feedstock comprising:
      i. at least one carbon source selected from the group consisting of $C_1$ to $C_7$ hydrocarbons and $C_1$ to $C_7$ alcohols; and
      ii. at least one catalyst composition comprising at least one element selected from the group consisting of iron, nickel, and cobalt;
   b) injecting a carrier gas in said reactor; wherein said carrier gas is selected from the group consisting of nitrogen and argon; and
   c) evaporating and decomposing said feedstock by heating, using a furnace, to form said carbon nanotubes, which are deposited on a substrate positioned in said reactor at a location distant from the furnace for easy recovery of said carbon nanotubes films where the temperature is less than 200° C.,
   wherein the evaporation of said feedstock is performed at a temperature ranging from 400 ° C. to 600° C.,
   wherein the decomposition of said feedstock is performed at a temperature ranging from 800 ° C. to 1300° C., and
   wherein the crystallinity of said carbon nanotubes is greater than 5.

2. The process as claimed in claim 1, wherein said catalyst composition comprises:
   a catalyst in the range of 0.1 to 5 wt % of said feedstock;
   optionally, a co-catalyst in the range of 0.1 to 5 wt % of said feedstock; and
   optionally, a growth promoter in the range of 0.1 to 10 wt % of said feedstock.

3. The process as claimed in claim 2, wherein said catalyst is ferrocene.

4. The, process as claimed in claim 2, wherein said co-catalyst is at least one selected from the group consisting of nickelocene and cobaltocene.

5. The process as claimed in claim 2, wherein said growth promoter is at least one selected from the group consisting of molybdenum, bismuth and at least one sulfur containing compound selected from the group consisting of thiophene, hydrogen sulfide, carbon di-sulfide and thio-urea.

6. The process as claimed in claim 1, wherein said carbon nanotubes are continuously produced in the form of free-standing carbon nanotubes mats.

7. The process as claimed in claim 1, wherein the material of said substrate is at least one selected from the group consisting of:
   at least one metal selected from the group consisting of copper and tungsten;
   at least one alloy selected from the group consisting of brass and stainless steel;
   at least one metal compound selected from the group consisting of magnesium oxide, zinc oxide, and tungsten carbide;
   at least one polymer selected from the group consisting of polyethylene (PE), polytetrafluoroethylene (PTFE), polyethylene terephthalate (PET) and polyvinyl chloride (PVC);
   at least one semiconductor including indium tin oxide (ITO) coated glass;
   at least one glass plate, wherein the glass plate is made of glass that is selected from the group consisting of fiberglass mat, soda-lime glass, pyrex glass and borosil glass; and
   at least one fiber-reinforced polymer composite, wherein:
      the fiber is at least one selected from the group consisting of glass, carbon, carbon nanotubes, aramid, kevlar and polymer matrix; and
      the polymer is at least one selected from the group consisting of epoxy, polyvinylpyrrolidone (PVP), polyethylene terephthalate (PET), polypropylene (PP) and polyvinyl chloride (PVC) polymer.

* * * * *